Patented Jan. 6, 1942

2,269,203

UNITED STATES PATENT OFFICE 2,269,203

TREATMENT OF LIQUID SUGAR

Lawrence T. Hopkinson, Washington, D. C.

No Drawing. Application November 30, 1938,
Serial No. 243,296

7 Claims. (Cl. 99—142)

My invention relates to the treatment of liquid sugar, such as raw sugar juice, molasses and the like for the purpose of preserving the sugar against decomposition and for other purposes.

Prior to the adoption of my present invention, the various industries engaged in converting liquid sugar into crystal sugar, and into distillates such as alcohol, were confronted with the problem of preventing bacterial decomposition of the liquid sugar during storage and processing. The difficulty has existed throughout the industry generally, but it has been particularly acute in the handling of cane sugar juice, where the liquids extracted from the cane had to be processed promptly to prevent spoilage. Since the harvesting of cane is subject to weather and growing conditions largely or entirely beyond human control it is not uncommon for large supplies of juices and syrups to accumulate over short periods of time at certain seasons of the year, particularly when the cane or other sugar-bearing material has been subjected to frost or frost is threatened, so that the crop must be harvested promptly. In such cases the stores of juice accumulate beyond the capacity of the processing equipment to handle the material, and in the past great losses have been sustained through spoilage of these excess quantities of juice.

Efforts have been made heretofore to treat with a chemical preservative such juices as had to be stored beyond the length of time the material would naturally remain unspoiled. So far as I am aware, formaldehyde is generally considered to be the best of the prior art preservatives for dilute, fresh juice, and milk of lime and chloride of lime are regarded as the best of the previously known preservatives for fermented or gummy material. Prior to my invention these prior art preservatives were used to some extent, but they were never widely adopted, because each of them possesses inherent disadvantages. Formaldehyde, for example, may be removed to a considerable extent by heating the treated juice, but complete removal is practically impossible. Formaldehyde forms certain toxic substances in the juice which remain in the final products of the juice processing steps. These substances unfit the final products for use as human or animal food. Milk of lime and chloride of lime are commercially incapable of being economically removed from juices treated with them.

My present invention proposes treating the juice with acetaldehyde. I have found that such treatment, when practiced as will be explained hereinafter, effectively preserves liquid sugar against decomposition. The treatment is free of the disadvantages of the previously used chemicals, and, in addition to effecting substantial preservation for any reasonable length of time, it confers on the treated juice certain desirable properties and characteristics not heretofore attainable.

An important advantage of the acetaldehyde treatment proposed by this invention consists in the ease and completeness by which the preservative may be removed from the juice. It is necessary only to heat the treated juice. The separation is substantially complete, and the juice is found to be pure, uncontaminated and entirely devoid of toxic or other undesirable additions, being in every respect comparable in quality to fresh, untreated juice.

A further advantage of acetaldehyde, as compared with formaldehyde, resides in the fact that in its action on sugar juice the former is approximately two and one-half times as efficient as the latter in inhibiting bacterial growth. From this it follows that appreciably smaller proportions of acetaldehyde may be successfully used.

I have found that acetaldehyde will adequately preserve crude sugar juice for at least one day when used in approximately the proportions of two parts per one thousand parts juice by weight. To preserve more refined or less contaminated liquid sugars the proportions may be reduced to as little as 0.02 part acetaldehyde per one thousand parts, by weight, of juice. To preserve for longer periods, the proportion of acetaldehyde should be slightly increased. The precise proportions required in any particular case will vary somewhat through the foregoing range, and in some instances beyond it, depending on temperature, the stage to which bacterial decomposition has advanced, the concentration of the juice, the length of time over which preservation is desired, the final products to be obtained (crystal sugar, syrup, molasses, alcohol, or various combinations of them), and other factors, as will be readily understood.

In practicing the invention I prefer to add the acetaldehyde to the liquid sugar in aqueous solution. Acetaldehyde has a high vapor pressure and is inflammable. However, in the form of a ten per cent solution in water it is not inflammable and its vapor pressure is materially reduced. In this form it is of course more easily and safely handled. It can be contained in ordinary watertight barrels, and no special equipment is needed to effect its introduction into the juice and its admixture therewith, which may be accomplished by simple stirring or the like.

From what has been stated hereinabove, it will be recognized that it is advantageous to add the acetaldehyde solution to the juice fairly promptly, or at least before any considerable decomposition has set in.

The acetaldehyde is completely removed by the application of heat to the treated juice. The usual processing of the juice to produce the desired commercial products involves heating, and these heating operations may be relied on to drive off the acetaldehyde. Thus, in the production of crystal sugar from juice preserved by my new method it is found that the acetaldehyde is substantially removed by the time that less than twenty-five per-cent of the sugar solution has been evaporated, and this rate of separation can be accelerated if the boiling sugar solution be agitated.

I have observed that both dilute juices and the more concentrated unstable solutions, such as molasses, when treated with acetaldehyde in accordance with the present invention, give end products which in quality and yield are superior to those obtained from untreated but otherwise comparable raw materials. This is an added advantage and object of the invention.

I am aware of the fact that acetaldehyde is a product of the oxidation of ordinary ethylic alcohol and that traces of it are formed in wine during the process of ageing and under certain circumstances in the production of alcohol, and that slight traces are sometimes naturally formed in liquid sugar. However, my invention is fundamentally distinguished from each and all of these natural phenomena inasmuch as it comprises adding acetaldehyde to liquid sugar, so that the treated sugar contains acetaldehyde in amounts exceeding that which would otherwise naturally occur in it.

In this specification and in the appended claims the terms "liquid sugar," "sugar juice" and "juice" are used synonymously and interchangeably.

I claim:

1. The method of preserving liquid sugar against decomposition and of improving the yield therefrom of food products including crystal sugar, syrup, molasses and distillates which comprises admixing acetaldehyde with the liquid sugar prior to a period of storage and thereafter evaporating the acetaldehyde.

2. The method of preserving liquid sugar against decomposition and of improving the yield therefrom of food products including crystal sugar, syrup, molasses and distillates which comprises adding acetaldehyde to the liquid sugar in the ratio of from 0.02 part to 2 parts acetaldehyde per 1,000 parts liquid sugar by weight prior to a period of storage and thereafter evaporating the acetaldehyde.

3. The method of preserving liquid sugar against decomposition and of improving the yield therefrom of food products including crystal sugar, syrup, molasses and distillates which comprises adding acetaldehyde to the liquid sugar to prevent decomposition during a period of holding prior to further processing, and thereafter heating the treated liquid sugar to remove the acetaldehyde.

4. The method of preserving liquid sugar against decomposition and of improving the yield therefrom of food products including crystal sugar, syrup, molasses and distillates which comprises admixing with the liquid sugar a quantity of acetaldehyde dissolved in water in the proportions of approximately ten per cent acetaldehyde and ninety per cent water prior to a period of storage and thereafter evaporating the acetaldehyde.

5. As a composition of matter adapted to be processed to provide food products, liquid sugar characterized by improved resistance to decomposition comprising liquid sugar containing added acetaldehyde intimately mixed therewith.

6. As a composition of matter, liquid sugar adapted to be processed to provide food products and characterized by improved resistance to decomposition comprising liquid sugar containing added acetaldehyde in substantially the proportions of from 0.02 part to 2 parts acetaldehyde per 1,000 parts liquid sugar by weight intimately mixed therewith.

7. The method of treating liquid sugar to preserve it against decomposition during a storage period and to improve the yield therefrom of food products including crystal sugar, syrup, molasses and distillates which comprises intimately admixing with substantially undecomposed liquid sugar, as by stirring, a quantity of aqueous solution of acetaldehyde, maintaining the acetaldehyde in the sugar during the storage period, and thereafter evaporating the acetaldehyde.

LAWRENCE T. HOPKINSON.